United States Patent
Fu et al.

(10) Patent No.: US 11,784,582 B2
(45) Date of Patent: Oct. 10, 2023

(54) POWER COMPONENT OF THREE-LEVEL CONVERTER, THREE-LEVEL CONVERTER AND WIND TURBINE

(71) Applicant: BEIJING GOLDWIND SCIENCE & CREATION WINDPOWER EQUIPMENT CO., LTD., Beijing (CN)

(72) Inventors: Songge Fu, Beijing (CN); Xiaofeng Yuan, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/995,701

(22) PCT Filed: Jun. 30, 2021

(86) PCT No.: PCT/CN2021/103805
§ 371 (c)(1),
(2) Date: Oct. 6, 2022

(87) PCT Pub. No.: WO2022/022213
PCT Pub. Date: Feb. 3, 2022

(65) Prior Publication Data
US 2023/0133950 A1    May 4, 2023

(30) Foreign Application Priority Data

Jul. 31, 2020  (CN) .......................... 202010758876.8

(51) Int. Cl.
*H02M 7/487* (2007.01)
*H02M 1/00* (2006.01)
(Continued)

(52) U.S. Cl.
CPC ......... *H02M 7/487* (2013.01); *H02M 1/0054* (2021.05); *H02M 7/003* (2013.01); *H02M 7/5387* (2013.01); *H02J 2300/28* (2020.01)

(58) Field of Classification Search
CPC .... H02M 7/487; H02M 1/0054; H02M 7/003; H02M 7/5387; F03D 15/00; H02J 2300/28
See application file for complete search history.

(56) References Cited

U.S. PATENT DOCUMENTS 9,948,206 B2 *  4/2018  Hasegawa ............. H02M 7/483
10,063,161 B2 *  8/2018  Li ........................ H02K 7/183
(Continued)

FOREIGN PATENT DOCUMENTS

CN    102223098 A    10/2011
CN    102355153 A     2/2012
(Continued)

OTHER PUBLICATIONS

First Office Action in related Chinese Application No. 202010758876.8 dated Feb. 22, 2021 (9 pages).
(Continued)

*Primary Examiner* — Yusef A Ahmed
(74) *Attorney, Agent, or Firm* — Bayes PLLC

(57) ABSTRACT

The present application provides a power component of a three-level converter, a three-level converter and a wind turbine. The power component of the three-level converter includes: a first NPC bridge arm unit including a plurality of first NPC bridge arms connected in parallel; a second NPC bridge arm unit including a plurality of second NPC bridge arms connected in parallel; and a third NPC bridge arm unit including a plurality of third NPC bridge arms connected in parallel. The number of the second NPC bridge arms is the same as the number of the first NPC bridge arms, and the (Continued)

number of the third NPC bridge arms is determined based on the ratio of the loss of the first NPC bridge arm to the loss of the third NPC bridge arm.

20 Claims, 7 Drawing Sheets

(51) Int. Cl.
*H02M 7/00* (2006.01)
*H02M 7/5387* (2007.01)

(56) References Cited

U.S. PATENT DOCUMENTS

| | | | |
|---|---|---|---|
| 10,547,251 B1* | 1/2020 | Pan | H02M 1/36 |
| 11,063,527 B2* | 7/2021 | Trainer | H02M 7/487 |
| 2011/0249479 A1* | 10/2011 | Capitaneanu | H02M 7/487 |
| | | | 363/132 |
| 2012/0300514 A1* | 11/2012 | Kolar | H02J 3/1857 |
| | | | 363/39 |
| 2014/0111959 A1* | 4/2014 | Li | H02M 7/003 |
| | | | 174/68.2 |
| 2014/0313804 A1* | 10/2014 | Urushibata | H02M 1/14 |
| | | | 363/132 |
| 2015/0155770 A1* | 6/2015 | Ying | H02M 1/08 |
| | | | 307/52 |
| 2015/0311776 A1* | 10/2015 | Lavieville | H02M 7/4833 |
| | | | 363/65 |
| 2015/0340961 A1* | 11/2015 | Wen | H02M 5/4585 |
| | | | 363/37 |
| 2016/0094153 A1* | 3/2016 | Li | H02M 7/797 |
| | | | 363/123 |
| 2017/0302181 A1 | 10/2017 | Shimizu et al. | |
| 2017/0373586 A1* | 12/2017 | Zhang | H02M 7/5395 |
| 2018/0041109 A1* | 2/2018 | Xu | H02M 1/083 |
| 2018/0262124 A1* | 9/2018 | Hsin | H02M 7/487 |
| 2019/0181774 A1* | 6/2019 | Liu | H02M 7/4833 |
| 2019/0238062 A1* | 8/2019 | Lu | H03K 17/602 |
| 2019/0280615 A1* | 9/2019 | Ng | H02M 7/53871 |
| 2020/0177100 A1* | 6/2020 | Wang | H02M 7/5387 |
| 2020/0251981 A1* | 8/2020 | Thompson | H02M 1/32 |
| 2020/0406769 A1* | 12/2020 | Danner | B60L 53/24 |
| 2021/0067057 A1* | 3/2021 | Abarzadeh | H02M 7/4837 |
| 2021/0234475 A1* | 7/2021 | Banerjee | H02P 27/08 |
| 2021/0376739 A1* | 12/2021 | Liu | H02M 1/0074 |
| 2021/0408943 A1* | 12/2021 | Maki | H02M 7/483 |
| 2022/0231499 A1* | 7/2022 | Chen | H02H 9/04 |
| 2022/0321016 A1* | 10/2022 | Khaligh | H02M 3/33561 |
| 2022/0376602 A1* | 11/2022 | Yan | H02M 7/487 |

FOREIGN PATENT DOCUMENTS

| | | |
|---|---|---|
| CN | 105337524 A | 2/2016 |
| CN | 108134384 A | 6/2018 |
| CN | 108631357 A | 10/2018 |
| CN | 107104603 B | 6/2019 |
| CN | 110061648 A | 7/2019 |
| CN | 111313735 A | 6/2020 |
| CN | 210898928 U | 6/2020 |
| CN | 112003490 A | 11/2020 |
| WO | 2019025399 A1 | 2/2019 |

OTHER PUBLICATIONS

International Search Report in related PCT Application No. PCT/CN2021/103805 dated Sep. 26, 2021 (11 pages).

* cited by examiner

POWER COMPONENT OF THREE-LEVEL CONVERTER, THREE-LEVEL CONVERTER AND WIND TURBINE

CROSS-REFERENCE TO RELATED APPLICATIONS

This application is a national stage of International Application No. PCT/CN2021/103805, filed on Jun. 30, 3031, which claims priority to Chinese Patent Application No. 202010758876.8, filed on Jul. 31, 2020. The entire contents of each of the above-identified applications are expressly incorporated herein by reference.

TECHNICAL FIELD

The present application relates to the technical field of converter, and in particular, to a power component of a three-level converter, a three-level converter and a wind turbine.

A wind power converter can realize the alternating current—direct current—alternating current conversion between a wind turbine and a power grid, and is one of the important core components of the wind turbine. A neutral point clamped (NPC) three-level converter is one type of wind power converter, which can achieve an increase in a direct current bus voltage by using insulate gate bipolar transistor (IGBT) devices with a low blocking voltage, thereby increasing an alternating current output voltage and expanding a system power level; and therefore, it has been widely used.

However, in the existing NPC three-level converter, the losses of different IGBT devices are different, resulting in uneven distribution of losses of the IGBT devices of the NPC three-level converter, thereby increasing the design difficulty of a heat sink.

SUMMARY

Embodiments of the present application provide a power component of a three-level converter, a three-level converter, and a wind turbine, which can balance losses of NPC bridge arm units of the three-level converter, such that the losses of IGBT devices of the three-level converter are evenly distributed.

In a first aspect, an embodiment of the present application provides a power component of a three-level converter including:

a first NPC bridge arm unit, the first NPC bridge arm unit including a plurality of first NPC bridge arms connected in parallel, a first end of the first NPC bridge arm unit forming a direct current positive electrode end, and a second end of the first NPC bridge arm unit forming a direct current neutral point end;

a second NPC bridge arm unit, the second NPC bridge arm unit including a plurality of second NPC bridge arms connected in parallel, a first end of the second NPC bridge arm unit being connected to the second end of the first NPC bridge arm unit, and a second end of the second NPC bridge arm unit forming a direct current negative electrode end;

a third NPC bridge arm unit, the third NPC bridge arm unit including a plurality of third NPC bridge arms connected in parallel, a first end of the third NPC bridge arm unit being connected to a third end of the first NPC bridge arm unit, a second end of the third NPC bridge arm unit being connected to a third end of the second NPC bridge arm unit, and a third end of the third NPC bridge arm unit forming an alternating current end, wherein the number of the second NPC bridge arms is the same as the number of the first NPC bridge arms, and the number of the third NPC bridge arms is determined based on a ratio of a loss of the first NPC bridge arm to a loss of the third NPC bridge arm.

In a second aspect, an embodiment of the present application provides a three-level converter including the power component of the three-level converter as described above.

In a third aspect, an embodiment of the present application provides a wind turbine including the three-level converter as described above.

In the power component of the three-level converter, the three-level converter, and the wind turbine according to the embodiments of the present application, for the power component, the number of the first NPC bridge arms in the first NPC bridge arm unit is the same as the number of the second NPC bridge arms in the second NPC bridge arm unit, and the number of the third NPC bridge arms in the third NPC bridge arm unit can be determined based on the ratio of the loss of the first NPC bridge arm to the loss of the third NPC bridge arm. Therefore, the number of the first NPC bridge arms, the number of the second NPC bridge arms and the number of the third NPC bridge arms can be adjusted based on the ratio between the losses, and then the number of IGBT devices controlled by each of the third NPC bridge arms can be adjusted, so as to adjust the loss corresponding to the switching action current of the IGBT device in each of the third NPC bridge arms and balance the losses of the IGBT devices in the NPC bridge arms, so that the losses of the IGBT devices of the three-level converter are evenly distributed.

BRIEF DESCRIPTION OF DRAWINGS

In order to illustrate technical solutions of embodiments of the present application more clearly, the drawings required for the embodiments of the present application will be briefly described. For those skilled in the art, other drawings can also be obtained from these drawings without any inventive effort.

DETAILED DESCRIPTION

Features of various aspects and exemplary embodiments of the present application will be described in detail below. In order to make objects, technical solutions and advantages of the present application clearer, the present application is further described in detail below with reference to the drawings and specific embodiments. It should be understood that, specific embodiments described herein are only for the illustration of the present application, not for limiting the present application. For those skilled in the art, the present application may be implemented without some of these specific details. The following description of the embodiments is only for providing a better understanding of the present application by illustrating examples of the present application.

In the description of the present application, it is noted that, unless otherwise specified, the meaning of "a plurality" is two or more; the terms "upper", "lower", "left", "right" and the like indicate orientations or positional relationships merely to facilitate and simplify description of the present application, and do not indicate or imply that the apparatuses or elements referred to must have a particular orientation, be constructed and operated in a particular orientation, and thus should not be construed as limiting the present application. In addition, terms "first", "second", and the like are merely used for the purpose of description and should not be understood as indicating or implying relative importance.

In the description of the present application, it should be further noted that, unless otherwise expressly specified and limited, the terms "installed", "connected" and "connection" should be understood in a broad sense, for example, they may refer to a fixed connection, and may also refer to a detachable connection, or an integral connection; it may refer to a direct connection, and may also refer to an indirect connection through an intermediate medium. For those with ordinary skills in the field, the specific meanings of the terms mentioned above in the present application can be understood in accordance with specific conditions. A wind power converter can realize the alternating current—direct current—alternating current conversion between the wind turbine and the power grid, and is one of the important core components of the wind turbine. A neutral point clamped (NPC) three-level converter is one type of wind power converter, which can achieve an increase in a direct current bus voltage by using insulate gate bipolar transistor (IGBT) devices with a low blocking voltage, thereby increasing an AC output voltage and expanding a system power level; and therefore, it has been widely used.

Figure 1:
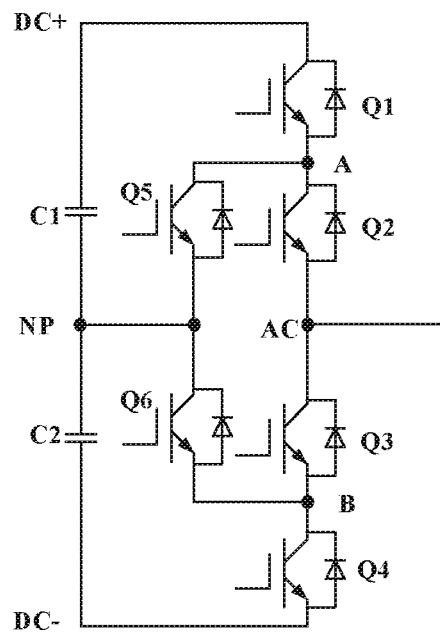
FIG. 1 is a schematic topological diagram of a power component of a three-level converter in the related art.

FIG. 1 shows a schematic topological diagram of a power component of a three-level converter in the related art. As shown in FIG. 1, a power component of a three-level converter in the related art may include IGBT devices Q1-Q6. Each IGBT device may include one IGBT and one freewheeling diode. A collector of the IGBT may form a collector of the IGBT device, an emitter of the IGBT may form an emitter of the IGBT device, and a gate of the IGBT may form a gate of the IGBT device. The collector of the IGBT may be connected to a cathode of the freewheeling diode, and the emitter of the IGBT may be connected to an anode of the freewheeling diode.

The IGBT devices Q1, Q2, Q3 and Q4 may be sequentially connected in series. Specifically, a collector of the IGBT device Q1 may form a direct current positive electrode end of the power component of the three-level converter for connecting with a positive electrode DC+ of the direct current bus of the three-level converter. An emitter of the IGBT device Q1 may be connected to a collector of the IGBT device Q2 to form a connection point A. An emitter of the IGBT device Q2 may be connected to a collector of the IGBT device Q3. An emitter of the IGBT device Q3 may be connected to a collector of the IGBT device Q4 to form a connection point B. An emitter of the IGBT device Q4 may form a direct current negative electrode end of the power component of the three-level converter for connecting with a negative electrode DC− of the direct current bus of the three-level converter.

In some embodiments, the emitter of the IGBT device Q2 and the collector of the IGBT device Q3 may form an alternating current end AC of the power component of the three-level converter.

The IGBT devices Q5 and Q6 may be sequentially connected in series. Specifically, a collector of the IGBT device Q5 may be connected to the collector of the GBT device Q2. An emitter of the IGBT device Q5 may be connected to a collector of the IGBT device Q6. An emitter of the IGBT device Q6 may be connected to the emitter of the IGBT device Q3. The emitter of the IGBT device Q5 and the collector of the IGBT device Q6 may form a direct current neutral point end of the power component of the three-level converter for connecting with a direct current bus neutral point NP of the three-level converter. The IGBTs in the IGBT devices Q5 and Q6 are always in an off state, so that the IGBT devices Q5 and Q6 are used as diodes in the power component of the three-level converter.

In some embodiments, the power component of the three-level converter may further include capacitors C1 and C2. One end of the capacitor C1 is connected to the collector of the IGBT device Q1, and the other end of the capacitor C1 is connected to the emitter of the IGBT device Q5 and the collector of the IGBT device Q6. One end of the capacitor C2 is connected to the emitter of the IGBT device Q4, and the other end of the capacitor C2 is connected to the emitter of the IGBT device Q5 and the collector of the IGBT device Q6.

With reference to FIG. 1, when the IGBT in the IGBT device Q2 is in an on state, the IGBT device Q5 clamps a potential of the connection point A to the same potential as NP; and when the IGBT in the IGBT device Q3 is in an on state, the IGBT device Q6 clamps a potential of the connection point B to the same potential as NP.

For the power component of the three-level converter shown in FIG. 1, the applicant has found several problems during use, which will be described below.

First, the applicant has carefully studied the principle of the commutation process of the power component of the three-level converter shown in FIG. 1.

Figure 2:
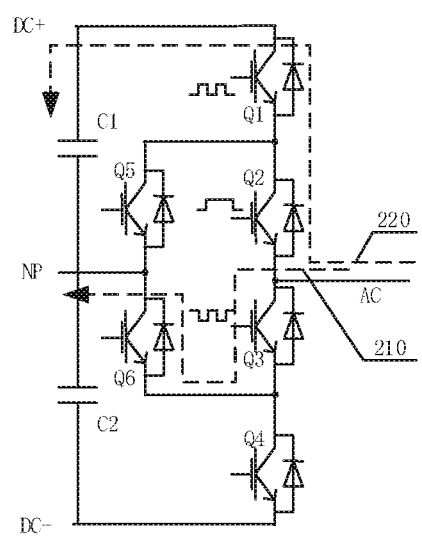
FIG. 2 is a schematic diagram of an example of a commutation loop of the power component shown in FIG. 1.
Figure 3:
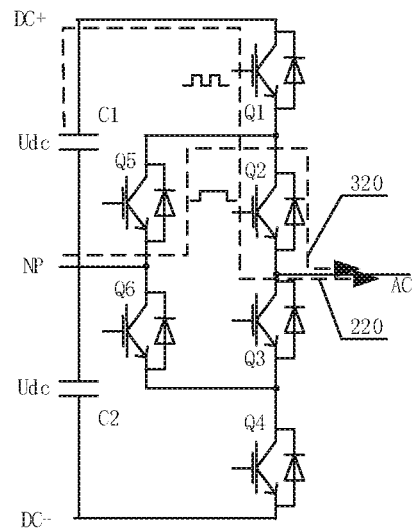
FIG. 3 is a schematic diagram of another example of a commutation loop of the power component shown in FIG. 1.
Figure 4:
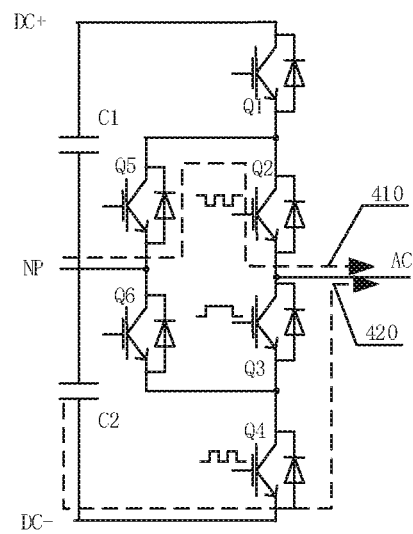
FIG. 4 is a schematic diagram of yet another example of a commutation loop of the power component shown in FIG. 1.
Figure 5:
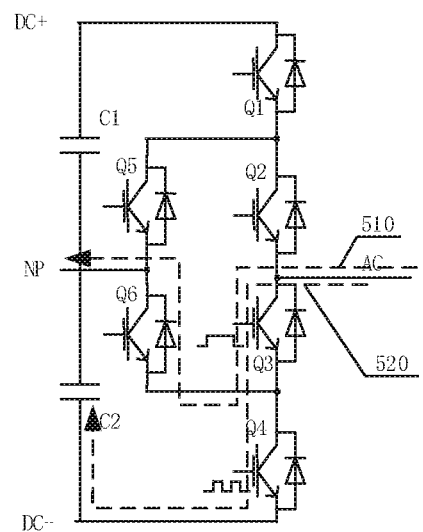
FIG. 5 is a schematic diagram of yet another example of a commutation loop of the power component shown in FIG. 1.

FIG. 2 shows a schematic diagram of an example of a commutation loop of the power component shown in FIG. 1. FIG. 3 shows a schematic diagram of another example of a commutation loop of the power component shown in FIG. 1. FIG. 4 shows a schematic diagram of yet another example of a commutation loop of the power component shown in FIG. 1. FIG. 5 shows a schematic diagram of yet another example of a commutation loop of the power component shown in FIG. 1.

As shown in FIG. 2, the current can flow into the power component of the three-level converter from the alternating current end AC. When the IGBT in the IGBT device Q3 is in the on state, the current can flow along a first path 210, that is, the current can flow through the IGBT in the IGBT device Q3 and the freewheeling diode in the IGBT device Q6 in sequence, and finally flows to the neutral point NP of the direct current bus. When the IGBT in the IGBT device Q3 is in the off state, the current can flow along a second path 220, that is, the current can flow through the freewheeling diode in the IGBT device Q2 and the freewheeling diode in the IGBT device Q1 in sequence, and finally flows to the positive electrode DC+ of the direct current bus.

When a gate interlock circuit for the IGBT in the IGBT device Q1 and the IGBT in the IGBT device Q3 is turned on, and the IGBT in the IGBT device Q2 is in a normally-on state, the current switches between the first path 210 and the second path 220, and at the same time, when the current in the first path 210 reduces, the current in the second path 220 increases. In the first path 210, the current flows to the NP potential, and the output current is at zero level. In the second path 220, the current flows to the DC+ potential, and the output current is at a positive level.

As shown in FIG. 5, the flow path of the current is similar to that of FIG. 2. In a seventh path 510, the current flows to the NP potential, and the output current is at zero level. In an eighth path 520, the current flows to the DC− potential, and the output current is at a negative level, which is not further detailed here.

As shown in FIG. 3, the current can flow out of the power component of the three-level converter from the alternating current end AC. When the IGBT in the IGBT device Q1 is in an on state, the current can flow along a third path 310, that is, the current can flow through the positive electrode DC+ of the direct current bus, the IGBT in the IGBT device Q1, the IGBT in the IGBT device Q2 in sequence, and finally flows to the alternating current end AC. When the IGBT in the IGBT device Q1 is in an off state, the current can flow along a fourth path 320, that is, the current can flow through the freewheeling diode in the IGBT device Q5 and the IGBT device Q2 in sequence, and finally flows to the alternating current end AC.

When a gate interlock circuit for the IGBT in the IGBT device Q1 and the IGBT in the IGBT device Q3 is turned on, and the IGBT in the IGBT device Q2 is in the normally-on state, the current switches between the third path 310 and the fourth path 320, and at the same time, when the current in the fourth path 320 reduces, the current in the third path 310 increases. In the third path 310, the current flows out from the DC+ potential, and the output current is at a positive level. In the fourth path 320, the current flows out from the NP potential, and the output current is at zero level.

As shown in FIG. 4, the flow path of the current is similar to that of FIG. 3. In a fifth path 410, the current flows out from the DC− potential, and the output current is at a negative level. In a sixth path 420, the current flows out from the NP potential, and the output current is at zero level.

It can be seen that, the above commutation process generates a pulse width modulation (PWM) output switching pulse of the power component. The switching pulse may have three states including positive level, zero level and negative level. When the switching pulse is at the positive level, the IGBT in the IGBT device Q2 is normally on. When the switching pulse is at the negative level, the IGBT in the IGBT device Q3 is normally on. When the switching pulse is at the zero level, the IGBT in the IGBT device Q2 or the IGBT in the IGBT device Q3 is kept at the on state, and a commutation switching action occurs between the IGBT in the IGBT device Q1 or the IGBT in the IGBT device Q4 and the IGBT in the IGBT device Q5 or the IGBT in the IGBT device Q6.

From the above commutation process, the characteristics of the commutation process of the power component can be concluded. In the grid-side inversion process of direct current DC/alternating current AC, when the power factor is close to 1 (the phases of the grid-side phase voltage and grid-side phase current are substantially coincident), at the moment when the switching pulse is at the positive level, the current flows out of the AC, and at the moment when the switching pulse is at the negative level, the current flows into the AC. As such, the IGBT device Q2 or the IGBT device Q3 is always in the on state during half of a duty cycle, the IGBT device Q2 and the IGBT device Q3 are subject to only the conduction loss of the IGBTs, and the IGBT device Q1, the IGBT device Q4, the IGBT device Q5 and the IGBT device Q6 are subject to the conduction loss and the switching loss.

Then, the applicant has carefully studied a pulse control principle of the power component of the three-level converter shown in FIG. 1.

Figure 6:
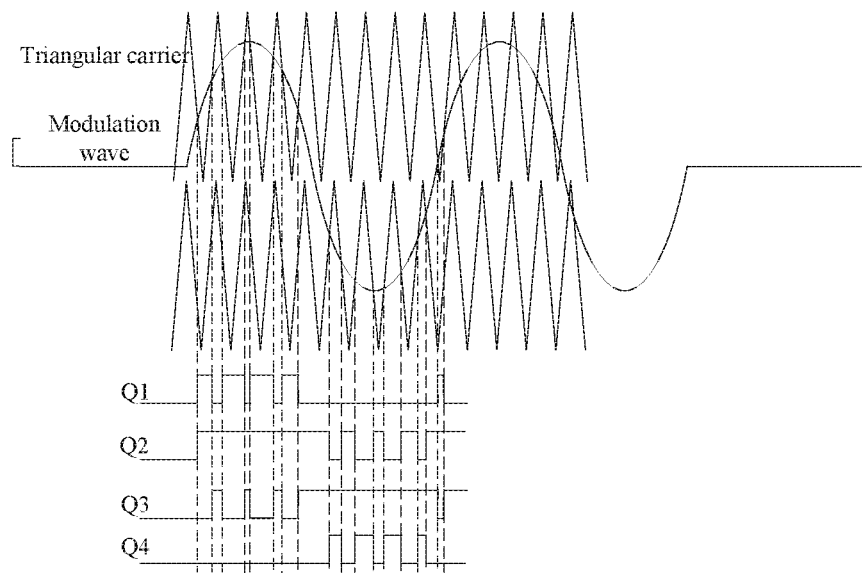
FIG. 6 is a schematic pulse diagram of the power component shown in FIG. 1.

FIG. 6 shows a schematic pulse diagram of the power component shown in FIG. 1.

As shown in FIG. 6, in half of a cycle of the modulation wave (the modulation wave and the grid-side phase voltage are the same in frequency and phase), the IGBT in the IGBT device Q2 or the IGBT in the IGBT device Q3 is always in an on state, and there is no PWM switching action. In contrast, the IGBT in the IGBT device Q1 or the IGBT in the IGBT device Q4 is in a high frequency PWM switching action state. Due to the high frequency switching action of the IGBT in the IGBT device Q1 and the IGBT in the IGBT device Q4, the losses of the IGBT in the IGBT device Q1 and the IGBT in the IGBT device Q4 are significantly higher than the losses of the IGBT in the IGBT device Q2 and the IGBT in the IGBT device Q3. Given that the freewheeling diode in IGBT device Q5 and the freewheeling diode in IGBT device Q6 perform the switching action synchronously, and that the freewheeling diode in IGBT device Q2 and the freewheeling diode in IGBT device Q3 do not perform the switching action, the losses of the freewheeling diode in the IGBT device Q5 and the freewheeling diode in the IGBT device Q6 are significantly higher than the losses of the freewheeling diode in the IGBT device Q2 and the freewheeling diode in the IGBT device Q3. It can be seen that, the losses of the IGBT device Q1, the IGBT device Q4, the IGBT device Q5 and the IGBT device Q6 are significantly higher than the losses of the IGBT device Q2 and the IGBT device Q3.

Finally, in the related art, a plurality of packaged NPC bridge arms are generally fit together to form a power component of a three-level converter. Therefore, the applicant has carefully studied a topological structure of the NPC bridge arm that can form the power component of the three-level converter shown in FIG. 1.

Figure 7:
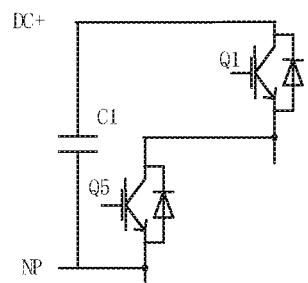
FIG. 7 is a schematic topological diagram of an NPC bridge arm in the related art.
Figure 8:
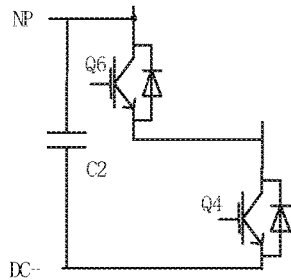
FIG. 8 is a schematic topological diagram of another NPC bridge arm in the related art.
Figure 9:
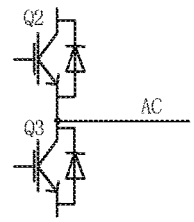
FIG. 9 is a schematic topological diagram of yet another NPC bridge arm in the related art.

FIG. 7 shows a schematic topological diagram of an NPC bridge arm in the related art. FIG. 8 shows a schematic topological diagram of another NPC bridge arm in the related art. FIG. 9 shows a schematic topological diagram of yet another NPC bridge arm in the related art.

As shown in FIG. 7, the NPC bridge arm may be a dual-transistor EconoDUAL package module, including the capacitor C1, the IGBT device Q1 and the IGBT device Q5 shown in FIG. 1. As shown in FIG. 8, the NPC bridge arm may be a dual-transistor EconoDUAL package module, including the capacitor C2, the IGBT device Q4 and the IGBT device Q6 shown in FIG. 1. As shown in FIG. 9, the NPC bridge arm may be a dual-transistor EconoDUAL package module, including the IGBT device Q2 and the IGBT device Q3 shown in FIG. 1.

Therefore, according to the above analysis of the pulse control principle and the analysis of each NPC bridge arm, it can be known that the losses of the IGBT devices are significantly unevenly distributed in the NPC bridge arms. The losses to which the NPC bridge arms shown in FIG. 7 and FIG. 8 are subject are high, and the losses to which the NPC bridge arm shown in FIG. 9 is subject are low.

In addition, in the related art, when the current outputting capability of the power component of the three-level converter shown in FIG. 1 cannot meet the requirements of the wind power converter, a plurality of the power components of the three-level converter shown in FIG. 1 are typically directly connected in hard-parallel to increase the output current, such that the gap of losses between different types of NPC bridge arms become larger. Due to the uneven loss distribution between different types of NPC bridge arms, separate designs of heat dissipation power for different NPC bridge arms are needed, which complicates the design of the heat sink responsible for cooling the IGBT devices. In addition, direct hard-parallel connection of multiple power components of the three-level converter shown in FIG. 1 causes a waste on the number of IGBT devices used, and increase the cost of the power component of the three-level converter.

In addition, by simulating the losses of the IGBT devices in the power component of the three-level converter shown in FIG. 1, the applicant has found that when the IGBT devices are of the same model, the ratio of the loss of the IGBT device Q1, the IGBT device Q4, the IGBT device Q5 or the IGBT device Q6 to the loss of the IGBT device Q2 or the IGBT device Q3 is fixed. For example, in an inversion state with a power factor of 1, the ratio between losses may be 1.55.

In order to solve the above problems, embodiments of the present application provide a power component of a three-level converter and a three-level converter, which can determine the number of different NPC bridge arms based on the ratio between losses found above, so that losses of IGBT devices of the three-level converter are evenly distributed. The power component of the three-level converter according to the embodiments of the present application will be described first.

Figure 10:
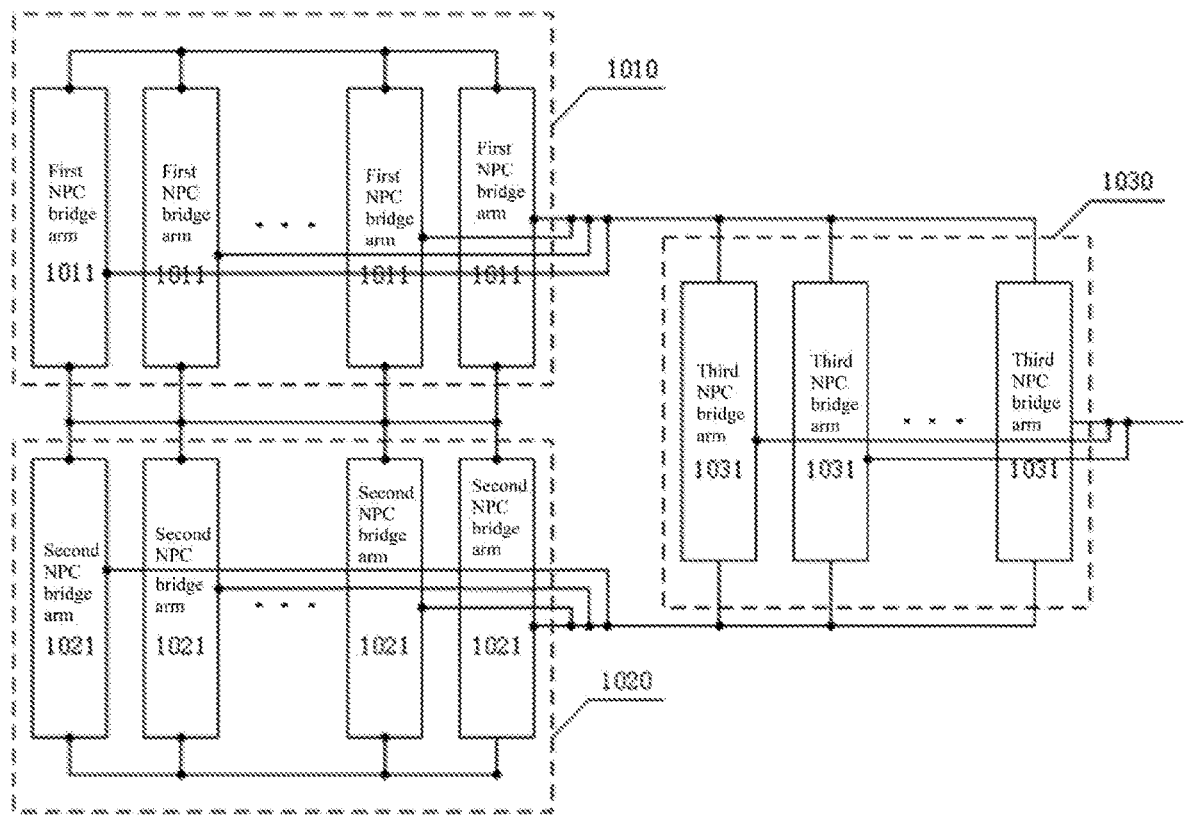
FIG. 10 is a schematic diagram of a circuit structure of a power component of a three-level converter according to an embodiment of the present application.

FIG. 10 shows a schematic diagram of a circuit structure of a power component of a three-level converter according to an embodiment of the present application.

As shown in FIG. 10, the power component of the three-level converter may include a first NPC bridge arm unit 1010, a second NPC bridge arm unit 1020 and a third NPC bridge arm unit 1030.

The first NPC bridge arm unit 1010 may include a plurality of first NPC bridge arms 1011 connected in parallel. First connection ends of the plurality of first NPC bridge arms 1011 are connected in parallel to form a first end of the first NPC bridge arm unit 1010. The first end of the first NPC bridge arm unit 1010 forms a direct current positive electrode end and for connecting with the positive DC+ of the direct current bus of the three-level converter. Second connection ends of the plurality of first NPC bridge arms 1011 are connected in parallel to form a second end of the first NPC bridge arm unit 1010. The second end of the first NPC bridge arm unit 1010 forms a direct current neutral point end for connecting with the neutral point NP of the direct current bus of the three-level converter. Third connection ends of the plurality of first NPC bridge arms 1011 are connected in parallel to form a third end of the first NPC bridge arm unit 1010.

In some embodiments of the present application, each of the first NPC bridge arms 1011 may include a first IGBT unit, a second IGBT unit and a first capacitor unit.

A first end of the first IGBT unit forms the first connection end of the first NPC bridge arm 1011. A second end of the first IGBT unit is connected to a first end of the second IGBT unit. A second end of the second IGBT unit forms the second connection end of the first NPC bridge arm 1011. The second end of the first IGBT unit and the first end of the second IGBT unit each form a third connection end of the first NPC bridge arm 1011. A first end of the first capacitor unit is connected to the first connection end of the first NPC bridge arm 1011, and a second end of the first capacitor unit is connected to the second connection end of the first NPC bridge arm 1011.

The first IGBT unit may include one IGBT device or two or more IGBT devices. In the case where the first IGBT unit includes one IGBT device, the collector of the IGBT device forms the first end of the first IGBT unit, and the emitter of the IGBT forms the second end of the first IGBT unit. In the case where the first IGBT unit includes two or more IGBT devices, the two or more IGBT devices may be connected in series or in parallel. When the IGBT devices are connected in series, the collector of a first one of the IGBT devices forms the first end of the first IGBT unit, and the emitter of the last one of the IGBTs forms the second end of the first IGBT unit. When the IGBT devices are connected in parallel, the collectors of two or more IGBT devices are connected in parallel to form the first end of the first IGBT unit, and the emitters of the two or more IGBTs are connected in parallel to form the second end of the first IGBT unit. It should be noted that, in the case where the first IGBT unit includes two or more IGBT devices, the two or more IGBT devices may be connected in a serial-parallel manner, and the specific connection manner of the two or more IGBT devices is not specifically limited.

Specifically, each IGBT device may include one IGBT and one freewheeling diode. The collector of the IGBT may form the collector of the IGBT device, the emitter of the IGBT may form the emitter of the IGBT device, and the gate of the IGBT may form the gate of the IGBT device. The collector of the IGBT may be connected to a cathode of the freewheeling diode, and the emitter of the IGBT may be connected to an anode of the freewheeling diode.

The structure of the second IGBT unit is similar to that of the first IGBT unit, and the details of which are not repeated here.

The first capacitor unit may include one first capacitor or two or more first capacitors. In the case where the first capacitor unit includes one first capacitor, a first end of the first capacitor forms the first end of the first capacitor unit, and a second end of the first capacitor forms the second end of the first capacitor unit. In the case where the first capacitor unit includes two or more first capacitors, the two or more first capacitors are connected in series, a first end of a first one of the first capacitors forms the first end of the first capacitor unit, and a second end of a last one of the first capacitors forms the second end of the first capacitor unit. It should be noted that, in the case where the first capacitor unit includes two or more first capacitors, the two or more first capacitors may be connected in parallel or in a serial-parallel manner, and the specific connection manner of the two or more first capacitor units is not specifically limited.

The second NPC bridge arm unit 1020 may include a plurality of second NPC bridge arms 1021 connected in parallel. First connection ends of the plurality of second NPC bridge arms 1021 are connected in parallel to form a first end of the second NPC bridge arm unit 1020. The first end of the second NPC bridge arm unit 1020 may form the direct current neutral point end. The first end of the second NPC bridge arm unit 1020 is connected to the second end of the first NPC bridge arm unit 1010. Second connection ends of the plurality of second NPC bridge arms 1021 are connected in parallel to form a second end of the second NPC bridge arm unit 1020. The second end of the second NPC bridge arm unit 1020 forms the direct current negative electrode end for connecting with the negative electrode DC− of the direct current bus of the three-level converter. Third connection ends of the plurality of second NPC bridge arms 1021 are connected in parallel to form a third end of the second NPC bridge arm unit 1020.

In some embodiments of the present application, each of the second NPC bridge arms 1021 may include a third IGBT unit, a fourth IGBT unit and a second capacitor unit.

A first end of the third IGBT unit forms the first connection end of the second NPC bridge arm 1021. A second end of the third IGBT unit is connected to a first end of the fourth IGBT unit. A second end of the fourth IGBT unit forms the second connection end of the second NPC bridge arm 1021. The second end of the third IGBT unit and the first end of the fourth IGBT unit each form the third connection end of the second NPC bridge arm 1021. A first end of the second capacitor unit is connected to the first connection end of the second NPC bridge arm 1021, and a second end of the second capacitor unit is connected to the second connection end of the second NPC bridge arm 1021.

The structures of the third IGBT unit and the fourth IGBT unit are each similar to the structure of the first IGBT unit, and the details of which are not repeated here. The structure of the second capacitor unit is similar to that of the first capacitor unit, and the details of which are not repeated here.

The third NPC bridge arm unit 1030 may include a plurality of third NPC bridge arms 1031 connected in parallel. First connection ends of the plurality of third NPC bridge arms 1031 are connected in parallel to form a first end of the third NPC bridge arm unit 1030. The first end of the third NPC bridge arm unit 1030 is connected to the third end of the first NPC bridge arm unit 1010. A second end of the third NPC bridge arm unit 1030 is connected to the third end of the second NPC bridge arm unit 1010. Third connection ends of the plurality of third NPC bridge arms 1031 are connected in parallel to form the third end of the third NPC bridge arm unit 1030. The third end of the third NPC bridge arm unit 1030 forms an alternating current end for connecting with the AC bus of the three-level converter.

In some embodiments of the present application, each of the third NPC bridge arms 1031 may include a fifth IGBT unit and a sixth IGBT unit.

A first end of the fifth IGBT unit forms the first connection end of the third NPC bridge arm 1031. A second end of the fifth IGBT unit is connected to a first end of the sixth IGBT unit. A second end of the sixth IGBT unit forms a second connection end of the third NPC bridge arm 1031. The second end of the fifth IGBT unit and the first end of the sixth IGBT unit each form the third connection end of the third NPC bridge arm 1031.

The structures of the fifth IGBT unit and the sixth IGBT unit are each similar to the structure of the first IGBT unit, and the details of which will not be repeated here.

In some embodiments of the present application, each of the above-mentioned NPC bridge arms may be a package module of any package type among EconoDUAL package module, IHM package module, 62 mm package module and PrimePACK package module. The package types of the NPC bridge arms are the same.

In the case where the NPC bridge arm is an EconoDUAL package module, the first NPC bridge arm 1011 may be the NPC bridge arm shown in FIG. 7, the second NPC bridge arm 1021 may be the NPC bridge arm shown in FIG. 8, and the third NPC bridge arm 1031 may be the NPC bridge arm shown in FIG. 9.

With reference to FIG. 10, the number of the second NPC bridge arms 1021 may be the same as the number of the first NPC bridge arms 1011. The number of the third NPC bridge arms 1031 may be determined based on the ratio of the loss of the first NPC bridge arm 1011 to the loss of the third NPC bridge arm 1031, so as to adjust the numbers of the first NPC bridge arms 1011, the second NPC bridge arms 1021 and the third NPC bridge arms 1031 based on the ratio of the loss of the first NPC bridge arm 1011 to the loss of the third NPC bridge arm 1031.

Taking the ratio of the loss of the first NPC bridge arm 1011 to the loss of the third NPC bridge arm 1031 being 1.55 as an example, the number of the third NPC bridge arms 1031 may be made less than the number of the first NPC bridge arms 1011 to increase the number of IGBT devices controlled by each of the third NPC bridge arms 1031, which further increases the loss corresponding to the switching action current of the IGBT devices in each of the third NPC bridge arms 1031, and increases the losses of the IGBT devices in each of the third NPC bridge arm 1031, thereby balancing losses of IGBT devices in the first NPC bridge arms 1011, the second NPC bridge arms 1021 and the third NPC bridge arms 1031.

In embodiments of the present application, the power component includes a first NPC bridge arm unit 1010, a second NPC bridge arm unit 1020 and a third NPC bridge arm unit 1030. The number of the first NPC bridge arms 1011 in the first NPC bridge arm unit 1010 is the same as the number of the second NPC bridge arms 1021 in the second NPC bridge arm unit 1020. The number of the third NPC bridge arms 1031 in the third NPC bridge arm unit 1030 can be determined based on the ratio of the loss of the first NPC bridge arm 1011 to the loss of the third NPC bridge arm 1031. Therefore, the numbers of the first NPC bridge arms 1011, the second NPC bridge arms 1021 and the third NPC bridge arms 1031 can be adjusted based on the ratio between losses, and then the number of IGBT devices controlled by each of the third NPC bridge arms 1031 can be adjusted to adjust the loss corresponding to the switching action current of the IGBT device in each of the third NPC bridge arms 1031, which balances the losses of the IGBT devices in the NPC bridge arms, so that the losses of the IGBT devices of the three-level converter are evenly distributed.

In some embodiments of the present application, since ratios of the loss of any one of the IGBT device Q1, the IGBT device Q4, the IGBT device Q5 and the IGBT device Q6 to the loss of any one of the IGBT device Q2 and the IGBT device Q3 are the same, a simulation test is performed on each IGBT device in the power component of the three-level converter shown in FIG. 1 to obtain a loss simulation result, and then the ratios of the loss of any one of the IGBT device Q1, the IGBT device Q4, the IGBT device Q5 and the IGBT device Q6 to the loss of any one of the IGBT device Q2 and the IGBT device Q3 is calculated.

The simulation test can be realized with the online simulation software IPOSIM of Infineon Technologies, Germany.

In some embodiments of the present application, the number of the third NPC bridge arms 1031 may be a value obtained by rounding up a quotient of the number of the first NPC bridge arms 1011 divided by the ratio.

Specifically, the number of the first NPC bridge arm 1011 may be divided by the ratio of the loss of the first NPC bridge arm 1011 to the loss of the third NPC bridge arm 1031. Then the quotient obtained by the division operation is rounded up, and the value obtained by the rounding up is the number of the third NPC bridge arms 1031. Therefore, based on the ratio of the loss of the first NPC bridge arm 1011 to the loss of the third NPC bridge arm 1031 and the number of the first NPC bridge arms 1011, the number of the third NPC bridge arms 1031 can be determined, so as to adjust the number of the third NPC bridge arms 1031.

Still taking the ratio of the loss of the first NPC bridge arm 1011 to the loss of the third NPC bridge arm 1031 being 1.55 as an example, if the number of the first NPC bridge arms 1011 is 4, then the number of the second NPC bridge arms 1021 is 4, and the number of the third NPC bridge arms 1031 is 3; if the number of the first NPC bridge arms 1011 is 3, then the number of the second NPC bridge arms 1021 is 3, and the number of the third NPC bridge arms 1031 is 2; if the number of the first NPC bridge arms 1011 is 5, then the number of the second NPC bridge arms 1021 is 5, and the number of the third NPC bridge arms 1031 is 4.

An example is used below to describe the topological structure of the power component of the three-level converter according to the embodiments of the present application.

Figure 11:
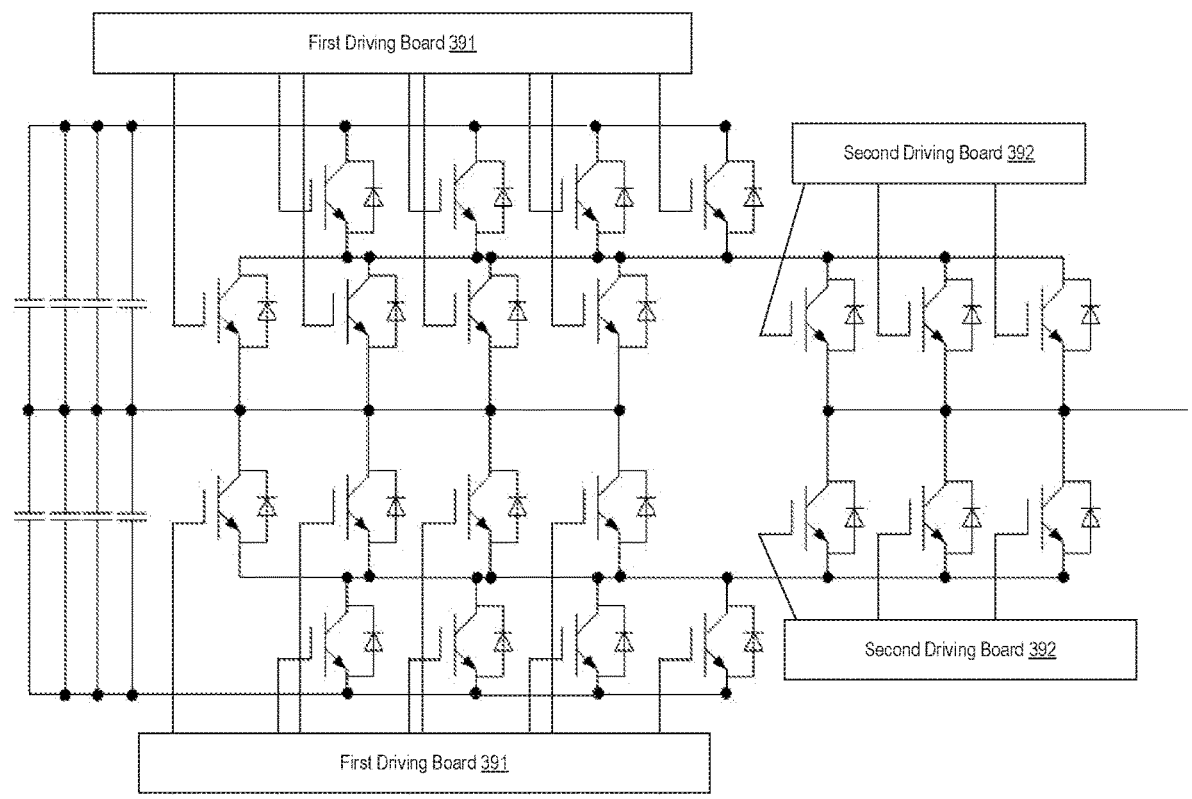
FIG. 11 is a schematic topological diagram of a power component of a three-level converter according to an embodiment of the present application.

FIG. 11 shows a schematic topological diagram of a power component of a three-level converter according to an embodiment of the present application.

As shown in FIG. 11, the power component of the three-level converter may include a first NPC bridge arm unit, a second NPC bridge arm unit and a third NPC bridge arm unit. The first NPC bridge arm unit may include four first NPC bridge arms connected in parallel. The second NPC bridge arm unit may include four second NPC bridge arms connected in parallel. The third NPC bridge arm unit may include four third NPC bridge arms connected in parallel.

Each of the first NPC bridge arms may be the NPC bridge arm shown in FIG. 7, each of the second NPC bridge arms may be the NPC bridge arm shown in FIG. 8, each of the third NPC bridge arms may be respectively the NPC bridge arm shown in FIG. 9, and the details of which will not be repeated here.

Specifically, the collectors of the IGBT devices Q1 in the four NPC bridge arms shown in FIG. 7 are connected in parallel, the emitters of the IGBT devices Q1 in the four NPC bridge arms shown in FIG. 7 are connected in parallel, and the emitters of the IGBT devices Q5 in the NPC bridge arms shown in FIG. 7 are connected in parallel. The collectors of the IGBT devices Q6 in the four NPC bridge arms shown in FIG. 8 are connected in parallel, the emitters of the IGBT devices Q6 in the four NPC bridge arms shown in FIG. 8 are connected in parallel, and the emitters of the IGBT devices Q4 in the four NPC bridge arms shown in FIG. 8 are connected in parallel. The collectors of the IGBT devices Q2 in the four NPC bridge arms shown in FIG. 9 are connected in parallel, the emitters of the IGBT devices Q2 in the four NPC bridge arms shown in FIG. 9 are connected in parallel, and the emitters of the IGBT devices Q3 in the four NPC bridge arms shown in FIG. 9 are connected in parallel.

Therefore, the topological structure of the power component of the three-level converter shown in FIG. 11 can increase the number of IGBT devices controlled by each of the third NPC bridge arms, thereby increasing the loss corresponding to the switching action current of the IGBT devices in each of the third NPC bridge arms, and increasing the losses of the IGBT devices in each of the third NPC bridge arms, thereby balancing the losses of the IGBT devices in the first NPC bridge arms, the second NPC bridge arms and the third NPC bridge arms.

In some embodiments of the present application, in order to improve the reliability of the IGBT device, the power component of the three-level converter may further include a heat dissipation plate. The heat dissipation plate may include a first heat dissipation region and a second heat dissipation region. A plurality of first NPC bridge arms and a plurality of second NPC bridge arms may be alternately arranged in the first heat dissipation region, and a plurality of third NPC bridge arms may be linearly arranged in the second heat dissipation region along the arrangement direction of the plurality of first NPC bridge arms and the plurality of second NPC bridge arms.

In some embodiments, when the plurality of first NPC bridge arms and the plurality of second NPC bridge arms may be arranged along the width direction of the heat dissipation plate, the plurality of third NPC bridge arms may also be arranged along the width direction of the heat dissipation plate.

In some other embodiments, when the plurality of first NPC bridge arms and the plurality of second NPC bridge arms may be arranged along the length direction of the heat dissipation plate, the plurality of third NPC bridge arms may also be arranged along the length direction of the heat dissipation plate.

Therefore, in embodiments of the present application, the IGBT devices in the first NPC bridge arm, the second NPC bridge arm and the third NPC bridge arm may be dissipated through one piece of heat dissipation plate. Since the plurality of first NPC bridge arms and the plurality of second NPC bridge arms can be alternately arranged, the heat distribution of the heat dissipation plate can be even, and the difficulty of designing the heat dissipation plate can be reduced.

Figure 12:
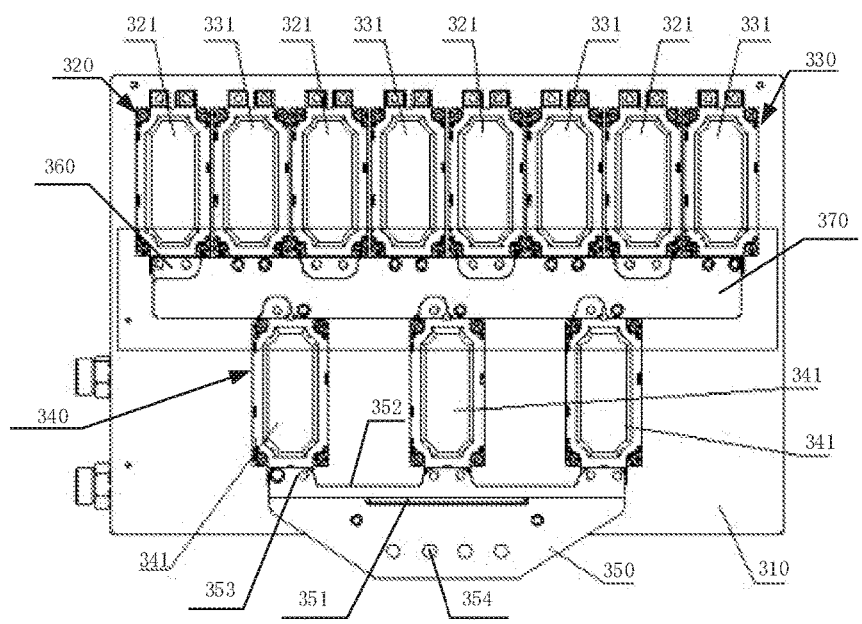
FIG. 12 is a schematic structural diagram of a power component of a three-level converter according to an embodiment of the present application.

FIG. 12 shows a schematic structural diagram of a power component of a three-level converter according to an embodiment of the present application. As shown in FIG. 12, the power component of the three-level converter may include a heat dissipation plate 310, four first NPC bridge arms 320, four second NPC bridge arms 330 and three third NPC bridge arms 340.

An upper half portion of the heat dissipation plate 310 may be the first heat dissipation region, and a lower half portion of the heat dissipation plate 310 may be the second heat dissipation region. The four first NPC bridge arms 320 and the four second NPC bridge arms 330 may be alternately arranged in the first heat dissipation region of the heat dissipation plate 310 in sequence along the width direction of the heat dissipation plate 310, and the three third NPC bridge arms 340 may be linearly arranged in the second heat dissipation region of the heat dissipation plate 310 in sequence along the width direction of the heat dissipation plate 310. Four corners of a packaging casing 321 of each of the first NPC bridge arms 320 are detachably connected to the heat dissipation plate 310 by bolts, so that the packaging casing 321 of the first NPC bridge arm 320 can be mounted on the heat dissipation plate 310. Four corners of a packaging casing 331 of each of the second NPC bridge arms 330 are detachably connected to the heat dissipation plate 310 by bolts, so that the packaging casing 331 of the second NPC bridge arm 330 can be mounted on the heat dissipation plate 310. Four corners of a packaging casing 341 of each of the third NPC bridge arms 340 are detachably connected to the heat dissipation plate 310 by bolts, so that the packaging casing 341 of the third NPC bridge arm 340 can be mounted on the heat dissipation plate 310.

In some embodiments of the present application, the third end of the first NPC bridge arm unit may include the third connection ends of the plurality of first NPC bridge arms, and the third connection ends of the plurality of first NPC bridge arms are connected in parallel. The third end of the second NPC bridge arm unit may include third connection ends of the plurality of second NPC bridge arms, and the third connection ends of the plurality of second NPC bridge arms are connected in parallel. The first end of the third NPC bridge arm unit may include the first connection ends of the plurality of third NPC bridge arms, and the first connection ends of the plurality of third NPC bridge arms are connected in parallel. The second end of the third NPC bridge arm unit may include the second connection ends of the plurality of third NPC bridge arms, and the second connection ends of the plurality of third NPC bridge arms are connected in parallel.

Therefore, in the power component of the three-level converter shown in FIG. 12, the losses of the first NPC bridge arm 320, the second NPC bridge arm 330 and the third NPC bridge arm 340 are similar, so that the heat dissipation plate 310 can be designed in a balanced way.

Figure 13:
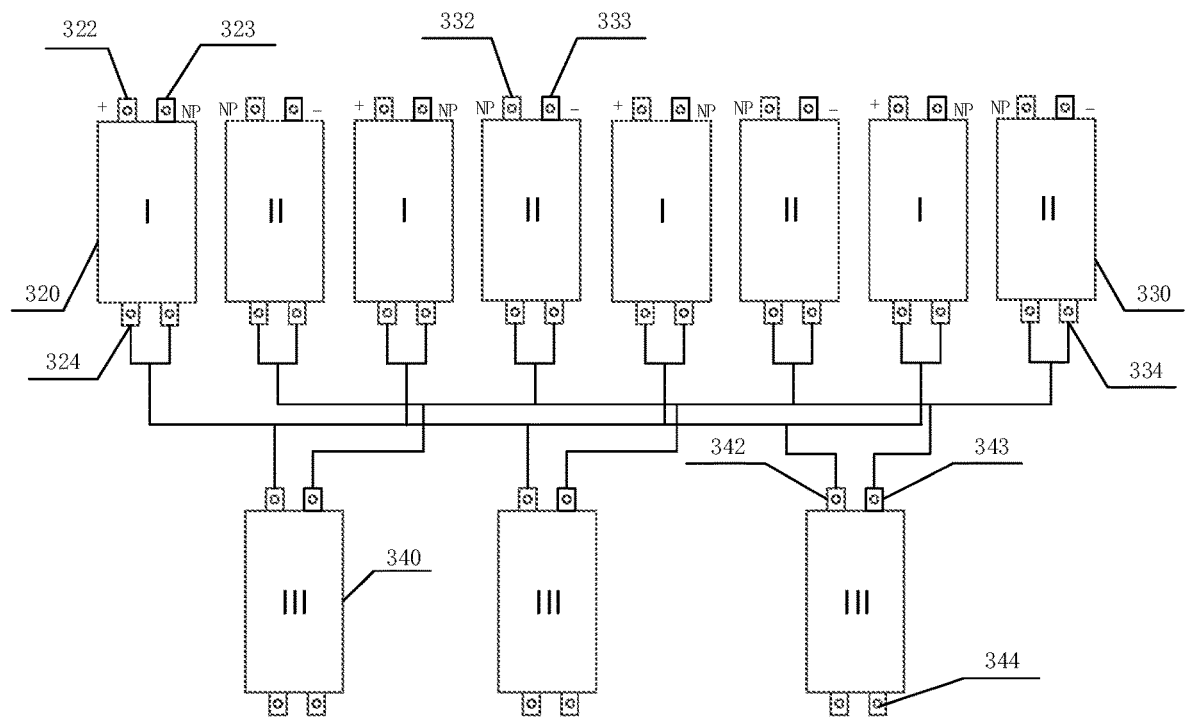
FIG. 13 is a schematic diagram of electrical connections between various NPC bridge arm units according to an embodiment of the present application.

FIG. 13 shows a schematic diagram of electrical connections between various NPC bridge arm units according to an embodiment of the present application.

As shown in FIG. 13, four first NPC bridge arms (bridge arm I) 320 and four second NPC bridge arms (bridge arm II) 330 are alternately arranged. Three third NPC bridge arms (bridge arm III) 340 are arranged in parallel to four first NPC bridge arms 320 and four second NPC bridge arms 330. Three third NPC bridge arms 340 are positioned below the four first NPC bridge arms 320 and the four second NPC bridge arms 330.

The first connection end of the first NPC bridge arm 320 may be a direct current positive electrode end 322. The second connection end of the first NPC bridge arm 320 may be a first direct current neutral point end 323. The first NPC bridge arm 320 may include two third connection ends. Each of the third connection ends of the first NPC bridge arm 320 may be a first bridge arm connection end 324.

In the case where the first NPC bridge arm 320 is the NPC bridge arm shown in FIG. 7, the collector of the IGBT device Q1 shown in FIG. 7 may form the direct current positive electrode end 322. The emitter of the IGBT device Q1 shown in FIG. 7 may form one first bridge arm connection end 324. The collector of the IGBT device Q5 shown in FIG. 7 may form another first bridge arm connection end 324. The emitter of the IGBT device Q5 shown in FIG. 7 may form the first direct current neutral point end 323.

The first connection end of the second NPC bridge arm 330 may be a second direct current neutral point end 332. The second connection end of the second NPC bridge arm 330 may be the direct current negative electrode end 333. The second NPC bridge arm 330 may include two third connection ends. Each of the third connection ends of the second NPC bridge arm 330 may be two second bridge arm connection ends 334 respectively.

In the case where the second NPC bridge arm 330 is the NPC bridge arm shown in FIG. 8, the collector of the IGBT device Q6 shown in FIG. 8 may form the second direct current neutral point end 332. The emitter of the IGBT device Q6 shown in FIG. 8 may form one second bridge arm connection end 334. The collector of the IGBT device Q4 shown in FIG. 8 may form another second bridge arm connection end 334. The emitter of the IGBT device Q4 shown in FIG. 8 may form a direct current negative electrode end 333.

The first connection end of the third NPC bridge arm 340 may be the third bridge arm connection end 342. The second connection end of the third NPC bridge arm 340 may be the fourth bridge arm connection end 343. The third NPC bridge arm 340 may include two third connection ends. Each of the third connection ends of the third NPC bridge arm 340 may be an alternating current end 344.

In the case where the third NPC bridge arm 340 is the NPC bridge arm shown in FIG. 9, the collector of the IGBT device Q2 shown in FIG. 9 may form the third bridge arm connection end 342. The emitter of the IGBT device Q2 shown in FIG. 9 may form one alternating current end 344. The collector of the IGBT device Q3 shown in FIG. 9 may form another alternating current end 344. The emitter of the IGBT device Q3 shown in FIG. 9 may form the fourth bridge arm connection end 343.

Specifically, each of the first bridge arm connection ends 324 may be respectively connected in parallel with each of the third bridge arm connection ends 342, and each of the second bridge arm connection ends 334 may be respectively connected in parallel with each of the fourth bridge arm connection ends 343.

Therefore, in the embodiments of the present application, it can be realized that the four-element parallel connection structure in which the first NPC bridge arms 320 and the second NPC bridge arms 330 are connected is connected to the three-element parallel connection structure in which the third NPC bridge arms 340 are connected.

In the embodiments of the present application, each of the third bridge arm connection ends 342 may be respectively connected to a bus connection neutral point of two adjacent first bridge arm connection ends 324. Each of the fourth bridge arm connection ends 343 may be respectively connected to the bus connection neutral point of the adjacent two second bridge arm connection ends 334, such that each of the third NPC bridge arms 340 is at the neutral point position, thereby ensuring a desired current-sharing effect of the three-element parallel connection structure.

In some embodiments of the present application, the power component of the three-level converter may further include a first connection busbar, a second connection busbar and an insulation structure. The first connection busbar may connect the third connection ends of the plurality of first NPC bridge arms with the first connection ends of the plurality of third NPC bridge arms. The second connection busbar may connect the third connection ends of the plurality of second NPC bridge arms with the second connection ends of the plurality of third NPC bridge arms. The insulation structure may be arranged between the first connection busbar and the second connection busbar, so that the first connection busbar and the second connection busbar are arranged in insulation, thereby making full use of the space and reducing the volume of the power component of the three-level converter.

Specifically, the first connection busbar may be a metal conductive structure, and is connected to the third connection ends of the plurality of first NPC bridge arms and the first connection ends of the plurality of third NPC bridge arms respectively, so that the third connection ends of the plurality of first NPC bridge arms are connected in parallel with the first connection ends of the plurality of third NPC bridge arms. The second connection busbar may be a metal conductive structure, and is connected to the third connection ends of the plurality of second NPC bridge arms and the second connection ends of the plurality of third NPC bridge arms respectively, so that the third connection ends of the plurality of second NPC bridge arms are connected in parallel with the second connection ends of the plurality of third NPC bridge arms.

The metal conductive structure may be a metal sheet or a copper bar, or the metal conductive structure may be other metals with conductive function, and the specific metal type of the metal conductive structure is not limited in the embodiments of the present application.

Figure 14:
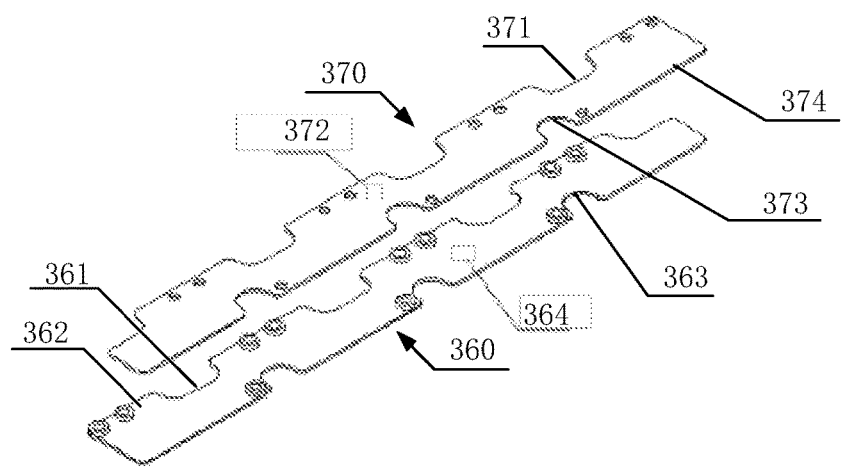
FIG. 14 is a schematic diagram of a connection structure according to an embodiment of the present application.

FIG. 14 shows a schematic diagram of a connection structure according to an embodiment of the present application. As shown in FIG. 14, the first connection busbar 360 and the second connection busbar 370 may be metal sheets, respectively. The first connection busbar 360 is provided with four first concave portions 361, four first convex portions 362, three second concave portions 363 and three second convex portions 364. The first concave portions 361 and the first convex portions 361 are alternately arranged on one side of the first connection busbar 360 along the length direction of the first connection busbar 360. The second concave portions 363 and the second convex portions 364 are alternately arranged on the other side of the first connection busbar 360 along the length direction of the first connection busbar 360. The second connection busbar 370 is provided with four third concave portions 371, four third convex portions 372, three fourth concave portions 373 and three fourth convex portions 374. The third concave portions 371 and the third convex portions 372 are alternately arranged on one side of the second connection busbar 370 along the length direction of the second connection busbar 370. The fourth concave portions 373 and the fourth convex portions 374 are alternately arranged on the other side of the second connection busbar 370 along the length direction of the second connection busbar 370. The third concave portions 371 and the third convex portions 372 are arranged on the same side as the first concave portions 361 and the first convex portions 361. The fourth concave portions 373 and the fourth convex portions 374 are arranged on the same side as the second concave portions 363 and the second convex portions 364.

With reference to FIG. 12, each of the first convex portions 362 of the first connection busbar 360 may be connected with all of the third connection ends of one first NPC bridge arm 320 shown in FIG. 12 by bolts respectively. The bolts penetrate through the third concave portions 371 of the second connection busbar 370 respectively. Each of the second convex portions 364 of the first connection busbar 360 may be connected with all of the first connection ends of one third NPC bridge arm 340 shown in FIG. 12 by bolts respectively. The bolts penetrate through the fourth concave portions 373 of the second connection busbar 370 respectively. Each of the third convex portions 372 of the second connection busbar 370 may be connected with all of the third connection ends of one second NPC bridge arm 330 shown in FIG. 12 by bolts respectively. The bolts penetrate through the first concave portions 361 of the first connection busbar 360 respectively. Each of the fourth convex portions 374 of the second connection busbar 370 may be connected with all of the second connection ends of one third NPC bridge arm 340 shown in FIG. 12 by bolts respectively. The bolts penetrate through the second concave portions 363 of the first connection busbar 360 respectively.

In some embodiments of the present application, with reference to FIG. 13, the third end of the third NPC bridge arm unit may further include third connection ends of a plurality of third NPC bridge arms, and the third connection ends of the plurality of third NPC bridge arms are connected in parallel.

In some embodiments of the present application, the power component of the three-level converter may further include an alternating current busbar. The alternating current busbar may be a metal conductive structure. The alternating current busbar may be connected with the third connection ends of the plurality of third NPC bridge arms respectively.

With reference to FIG. 12, the alternating current busbar 350 may be a copper busbar. An obround through via 351 may be formed on the alternating current busbar 350 to ensure the current-sharing effect when the third connection ends are connected in parallel.

The alternating current busbar 350 may further include two fifth concave portions 352 and three fifth convex portions 353. The fifth concave portions 352 and the fifth convex portions 353 are alternately arranged. Each of the fifth convex portions 353 is connected to all of the third connection ends of one third NPC bridge arm 340 by bolts respectively.

The alternating current busbar 350 may further include an alternating current end connection hole 354. The alternating current end connection hole 354 may be configured to be connected with the alternating current busbar.

In some embodiments of the present application, the power component of the three-level converter may further include a direct current busbar. The direct current busbar may be connected to the first heat dissipation region of the heat dissipation plate. The direct current busbar may be positioned on a side of the first heat dissipation region away from the second heat dissipation region. The direct current busbar may include a positive electrode of the direct current busbar, a neutral point of the direct current busbar, and a negative electrode of the direct current busbar. The positive electrode of the direct current busbar, the neutral point of the direct current busbar and the negative electrode of the direct current busbar may be each formed of a metal conductive structure, such as a metal sheet or a copper bar. The positive electrode of the direct current busbar, the neutral point of the direct current busbar and the negative electrode of the direct current busbar may be stacked. For insulation between the positive electrode of the direct current busbar, the neutral point of the direct current busbar and the negative electrode of the direct current busbar, an insulating member may be arranged between the positive electrode of the direct current busbar and the neutral point of the direct current busbar, and an insulating member may be arranged between the neutral point of the direct current busbar and the negative electrode of the direct current busbar.

In some embodiments of the present application, the first end of the first NPC bridge arm unit may include the first connection ends of the plurality of first NPC bridge arms. The second end of the first NPC bridge arm unit may include the second connection ends of the plurality of first NPC bridge arms. The first end of the second NPC bridge arm unit may include the first connection ends of the plurality of second NPC bridge arms. The second end of the second NPC bridge arm unit may include the second connection ends of the plurality of second NPC bridge arms. The first connection ends of the plurality of first NPC bridge arms may be each connected to the positive electrode of the direct current bus. The second connection ends of the plurality of first NPC bridge arms and the first connection ends of the plurality of second NPC bridge arms may be each connected to the neutral point of the direct current busbar. The second connection ends of the plurality of second NPC bridge arms may be each connected to the negative electrode of the direct current busbar.

In some embodiments, the direct current busbar may be directly connected to each of the first NPC bridge arms and each of the second NPC bridge arms.

In some other embodiments, the direct current busbar may be connected to each of the first NPC bridge arms and each of the second NPC bridge arms by a capacitor bank, and at the same time, the direct current busbar may play a role of fixing each of the capacitors in the capacitor bank.

Optionally, the power component of the three-level converter may further include a capacitor bank. The capacitor bank may be arranged on the direct current busbar. The capacitor bank may include first capacitor units and second capacitor units. A first end of each of the first capacitor units may be connected to the positive electrode of the direct current busbar and a corresponding first connection end of the first connection ends of the plurality of first NPC bridge arms. A second end of each of the first capacitor units may be connected to the neutral point of the direct current busbar and a corresponding second connection end of the second connection ends of the plurality of first NPC bridge arms. A first end of each of the second capacitor units may be connected to the neutral point of the direct current busbar and a corresponding first connection end of the first connection ends of the plurality of second NPC bridge arms. A second end of each of the second capacitor units may be connected to the negative electrode of the direct current busbar and a corresponding second connection end of the second connection ends of the plurality of second NPC bridge arms.

Specifically, the first capacitor unit may include a plurality of first capacitors. The first end of each of the first capacitors may be connected in parallel to form the first end of the first capacitor unit. The second end of each of the first capacitors may be connected in parallel to form the second end of the first capacitor unit. In some embodiments, a first end of each of the first capacitors may be connected to the positive electrode of the direct current busbar, and a second end of each of the first capacitors may be connected to the neutral point of the direct current busbar.

The second capacitor unit may include a plurality of second capacitors. A first end of each of the second capacitors may be connected in parallel to form the first end of the second capacitor unit. A second end of each of the second capacitors may be connected in parallel to form the second end of the second capacitor unit.

In some embodiments, the first end of each of the second capacitors may be connected to the neutral point of the direct current busbar. The second end of each of the second capacitors may be connected to the negative electrode of the direct current busbar.

Figure 15:
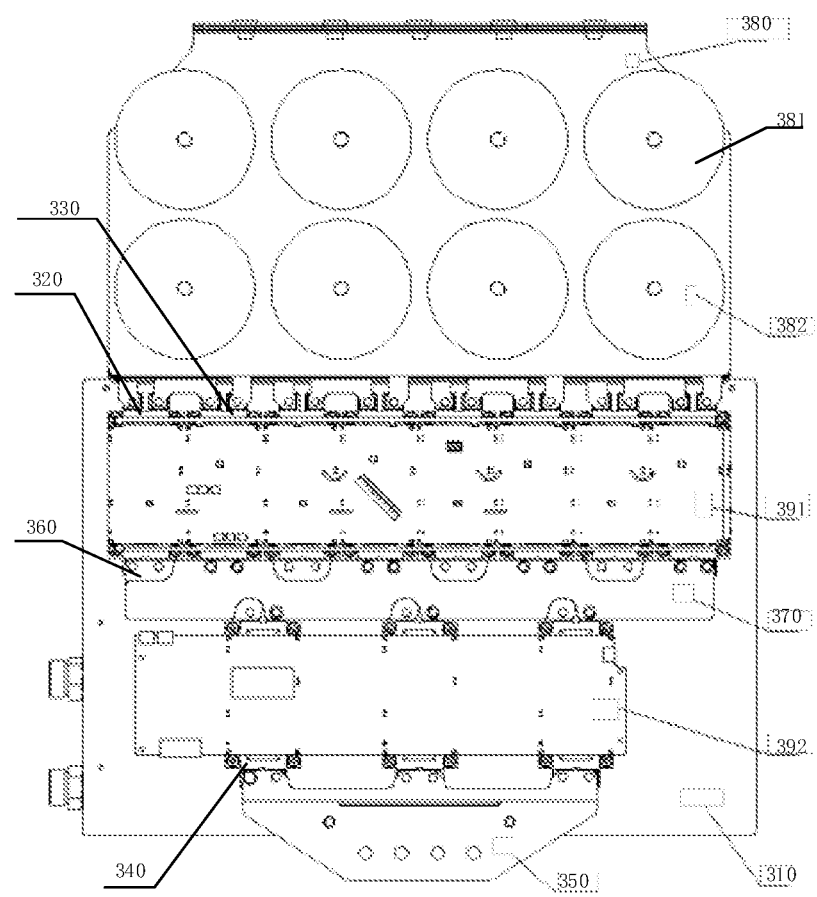
FIG. 15 is a schematic structural diagram of a power component of a three-level converter according to another embodiment of the present application.

FIG. 15 shows a schematic structural diagram of a power component of a three-level converter according to another embodiment of the present application. As shown in FIG. 15, the power component of the three-level converter may further include a direct current busbar 380. The direct current busbar 380 may be connected to the first heat dissipation region of the heat dissipation plate 310. The direct current busbar 380 may be positioned on a side of the first heat dissipation region away from the second heat dissipation region.

The direct current busbar 380 may be provided with four first capacitors 381 and four second capacitors 382. Since the number of the first capacitors 381 is the same as the number of the first NPC bridge arms 320, and the number of the second capacitors 382 is the same as the number of the second NPC bridge arms 330, so that a connection structure between the capacitors and the corresponding NPC bridge arms can be simplified.

In some embodiments, one first capacitor 381 and one second capacitor 382 are arranged along the vertical direction of the heat dissipation plate 310 and correspond to one first NPC bridge arm 320 and one second NPC bridge arm 330 adjacent thereto.

Figure 16:
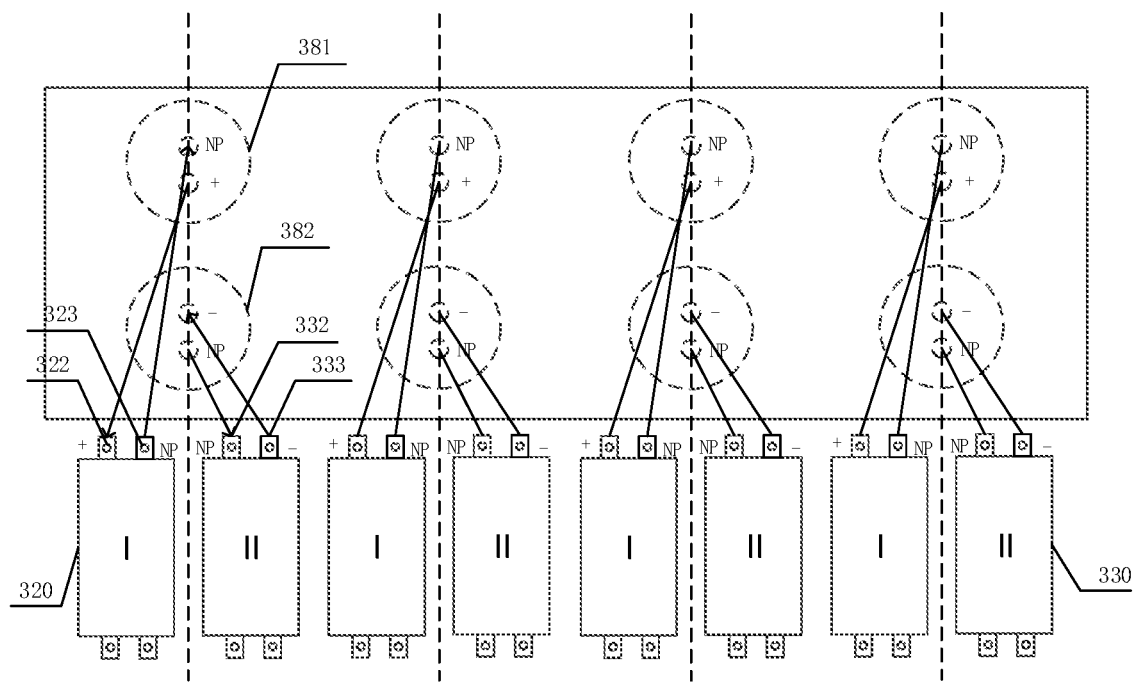
FIG. 16 is a schematic diagram of electrical connections between a capacitor bank and NPC bridge arm units according to an embodiment of the present application.

FIG. 16 shows a schematic diagram of electrical connections between the capacitor bank and the NPC bridge arm unit according to an embodiment of the present application.

As shown in FIG. 16, the first end of each of the first capacitors 381 may be connected to the direct current positive electrode end 322 of the adjacent first NPC bridge arm 320. The second end of each of the first capacitors 381 may be connected to the first direct current neutral point end 323 of the adjacent first NPC bridge arm 320. The first end of each of the second capacitors 382 may be connected to the second direct current neutral point end 332 of the adjacent second NPC bridge arm 330. The second end of each of the two capacitors 382 may be connected to the direct current negative electrode end 333 of the adjacent second NPC bridge arm 330.

Therefore, in embodiments of the present application, a symmetrical structural relationship of four groups of NPC bridge arms and direct current capacitors can be formed, and each of the direct current capacitors provides direct current support and ripple current to the corresponding NPC bridge arm respectively. When the IGBT device in the NPC bridge arm performs switching action and commutation, the direct current capacitor is charged or discharged synchronously. The charging and discharging paths of the direct current capacitor are shown by the arrows in FIG. 16 above. Current paths are opposite and substantially coincide, which can offset stray inductance on the current path of the direct current capacitor, and reduce the voltage stress in the commutation process, so as to significantly improve the current-sharing of the part with direct current parallel connection.

With reference to FIG. 15, the first end of each of the first capacitors 381 may be connected to the first connection end of the adjacent first NPC bridge arm 320 by a metal conductive structure. The second end of each of the first capacitors 381 may be connected to the second connection end of the adjacent first NPC bridge arm 320 by a metal conductive structure. The first end of each of the second capacitors 382 may be connected to the first connection end of the adjacent second NPC bridge arm 330. The second end of each of the second capacitors 382 may be connected to the second connection end of the adjacent second NPC bridge arm 330 by a metal conductive structure.

In some embodiments, the metal conductive structure may be a metal sheet or a copper bar.

In some embodiments of the present application, each of the first NPC bridge arms may include two or more IGBT devices connected in series. Each of the first NPC bridge arms is further provided with a gate connection end with each of the IGBT devices, respectively. The second NPC bridge arm may include two or more IGBT devices connected in series. Each of the second NPC bridge arms is further provided with a gate connection end with each of the IGBT devices, respectively.

In some embodiments of the present application, the power component of the three-level converter may further include a first driving board. The first driving board may be arranged on the first NPC bridge arm unit and the second NPC bridge arm unit. A first signal output end of the first driving board is connected with the gate of the first IGBT device. A second signal output end of the first driving board is connected with the gate of the second IGBT device.

Specifically, the first driving board may include a plurality of first signal output ends. One first signal output end corresponds to a gate of one IGBT device in one first NPC bridge arm. Each of the first signal output ends may be connected to the gate of the IGBT device through the gate connection end of the corresponding IGBT device. The first driving board may include a plurality of second signal output ends. One second signal output end corresponds to the gate of one IGBT device in one second NPC bridge arm. Each of the second signal output ends may be connected to the gate of the IGBT device through the gate connection end of the corresponding IGBT device.

With reference to FIG. 15, the power component of the three-level converter may further include a first driving board 391. The first driving board 391 may be arranged on the first NPC bridge arms 320 and the second NPC bridge arms 330.

In some embodiments of the present application, each of the third NPC bridge arms may include two or more IGBT devices connected in series. Each of the first NPC bridge arms is further provided with a gate connection end with each of the IGBT devices, respectively.

In some embodiments of the present application, the power component of the three-level converter may further include a second driving board. The second driving board may be arranged on the third NPC bridge arm unit. A signal output end of the second driving board is connected to the gates of the IGBT devices in the third NPC bridge arm.

Specifically, the second driving board may include a plurality of third signal output ends. One third signal output end corresponds to the gate of one IGBT device in one third NPC bridge arm. Each of the third signal output ends may be connected to the gate of the IGBT device through the gate connection end of the corresponding IGBT device.

With reference to FIG. 15, the power component of the three-level converter may further include a second driving board 392. The second driving board 392 may be arranged on the third NPC bridge arms 340.

To sum up, the power component of the three-level converter according to the embodiments of the present application achieves a balanced distribution of losses of the NPC bridge arms with an appropriate structural layout and an appropriate device configuration, and at the same time achieves a desired current-sharing effect and reduces the difficulty of designing the heat dissipation plate. In addition, the power component of the three-level converter can reduce the number of IGBTs used, thereby reducing the cost of the power component of the three-level converter.

The embodiments of the present application further provide a three-level converter. The three-level converter may include the power component of the three-level converter according to the embodiments of the present application.

In the embodiments of the present application, the power component of the three-level converter includes the first NPC bridge arm unit, the second NPC bridge arm unit and the third NPC bridge arm unit. The number of the first NPC bridge arms in the first NPC bridge arm unit is the same as the number of the second NPC bridge arms in the second NPC bridge arm unit, and the number of the third NPC bridge arms in the third NPC bridge arm unit can be determined based on the ratio of the loss of the first NPC bridge arm to the loss of the third NPC bridge arm. Therefore, the number of the first NPC bridge arms, the number of the second NPC bridge arms and the number of the third NPC bridge arms can be adjusted based on the ratio between the losses, and then the number of IGBT devices controlled by each of the third NPC bridge arms can be adjusted, so as to adjust the loss corresponding to the switching action current of the IGBT device in each of the third NPC bridge arms and balance the losses of the IGBT devices in the NPC bridge arms, so that the losses of the IGBT devices of the three-level converter are evenly distributed.

In some embodiments of the present application, the three-level converter may be any one of a wind power converter, a photovoltaic converter, an energy storage converter, and the like.

The embodiments of the present application further provide a wind turbine. The wind turbine may include the three-level converter according to the embodiments of the present application.

In some embodiments of the present application, the wind turbine may be any one of a direct-drive wind turbine, a doubly-fed wind turbine, a semi-direct-drive wind turbine, and the like.

It should be noted that the above are only specific implementations of the present application, those skilled in the art can clearly understand that the specific working processes of the above-described systems, modules and units can be referred to the corresponding processes in the foregoing method embodiments, for the convenience and brevity of the description, the details of which are not repeated here. It should be understood that the protection scope of the present application is not limited to the specific embodiments, any person skilled in the art can easily think of various equivalent modifications or replacements within the technical scope disclosed in the present application, and these modifications or replacements should all fall within the protection scope of the present application.

The invention claimed is:

1. A power component, comprising:
a first Neutral Point Clamped (NPC) bridge arm unit, the first NPC bridge arm unit comprising a plurality of first NPC bridge arms connected in parallel, a first end of the first NPC bridge arm unit forming a direct current positive electrode end, and a second end of the first NPC bridge arm unit forming a direct current neutral point end;
a second NPC bridge arm unit, the second NPC bridge arm unit comprising a plurality of second NPC bridge arms connected in parallel, a first end of the second NPC bridge arm unit being connected to the second end of the first NPC bridge arm unit, and a second end of the second NPC bridge arm unit forming a direct current negative electrode end; and a third NPC bridge arm unit, the third NPC bridge arm unit comprising a plurality of third NPC bridge arms connected in parallel, a first end of the third NPC bridge arm unit being connected to a third end of the first NPC bridge arm unit, a second end of the third NPC bridge arm unit being connected to a third end of the second NPC bridge arm unit, and a third end of the third NPC bridge arm unit forming an alternating current end, wherein a total number of the second NPC bridge arms in the second NPC bridge arm unit is the same as a total number of the first NPC bridge arms in the first NPC bridge arm unit, and a total number of the third NPC bridge arms in the third NPC bridge arm unit is determined based on a ratio of a loss of the first NPC bridge arms to a loss of the third NPC bridge arms.

2. The power component according to claim 1, wherein the total number of the third NPC bridge arms is a value rounded up from a quotient of the total number of the first NPC bridge arms divided by the ratio.

3. The power component according to claim 1, further comprising:
a heat dissipation plate, the heat dissipation plate comprising a first heat dissipation region and a second heat dissipation region,
wherein the plurality of first NPC bridge arms and the plurality of second NPC bridge arms are alternately arranged in the first heat dissipation region, and
wherein the plurality of third NPC bridge arms are linearly arranged in the second heat dissipation region along an arrangement direction of the plurality of first NPC bridge arms and the plurality of second NPC bridge arms.

4. The power component according to claim 3, wherein;
the third end of the first NPC bridge arm unit comprises third connection ends of the plurality of first NPC bridge arms, the third end of the second NPC bridge arm unit comprises third connection ends of the plurality of second NPC bridge arms, the first end of the third NPC bridge arm unit comprises first connection ends of the plurality of third NPC bridge arms, and the second end of the third NPC bridge arm unit comprises second connection ends of the plurality of third NPC bridge arms; and
the power component further comprises:
a first connection busbar, the first connection busbar connecting the third connection ends of the plurality of first NPC bridge arms with the first connection ends of the plurality of third NPC bridge arms;
a second connection busbar, the second connection busbar connecting the third connection ends of the plurality of second NPC bridge arms with the second connection ends of the plurality of third NPC bridge arms; and
an insulation structure, the insulation structure being arranged between the first connection busbar and the second connection busbar.

5. The power component according to claim 3, further comprising:
a direct current busbar, the direct current busbar being connected to the first heat dissipation region of the heat dissipation plate, the direct current busbar comprising a positive electrode of the direct current busbar, and a neutral point of the direct current busbar and a negative electrode of the direct current busbar, wherein the first end of the first NPC bridge arm unit comprises first connection ends of the plurality of first NPC bridge arms, and the second end of the first NPC bridge arm unit comprises second connection ends of the plurality of first NPC bridge arms,
wherein the first end of the second NPC bridge arm unit comprises first connection ends of the plurality of second NPC bridge arms, and the second end of the second NPC bridge arm unit comprises second connection ends of the plurality of second NPC bridge arms, and
wherein the first connection ends of the plurality of first NPC bridge arms are each connected to the positive electrode of the direct current busbar, the second connection ends of the plurality of first NPC bridge arms and the first connection ends of the plurality of second NPC bridge arms are each connected to the neutral point of the direct current busbar, and the second connection ends of the plurality of second NPC bridge arms are each connected to the negative electrode of the direct current busbar.

6. The power component according to claim 5, further comprising:
a capacitor bank, the capacitor bank being arranged on the direct current busbar, the capacitor bank comprising first capacitor units and second capacitor units, a first end of each of the first capacitor units being connected to the positive electrode of the direct current busbar and a corresponding first connection end of the first connection ends of the plurality of first NPC bridge arms, a second end of each of the first capacitor units being connected to the neutral point of the direct current busbar and a corresponding second connection end of the second connection ends of the plurality of first NPC bridge arms, a first end of each of the second capacitor units being connected to the neutral point of the direct current busbar and a corresponding first connection end of the first connection ends of the plurality of second NPC bridge arms, and a second end of each of the second capacitor units being connected to the negative electrode of the direct current busbar and a corresponding second connection end of the second connection ends of the plurality of second NPC bridge arms.

7. The power component according to claim 3, wherein:
the first NPC bridge arm comprises two or more first IGBT devices connected in series, and the second NPC bridge arm comprises two or more second IGBT devices connected in series; and
the power component further comprises:
a first driving board, the first driving board being arranged on the first NPC bridge arm unit and the second NPC bridge arm unit, a first signal output end of the first driving board being connected to each of gates of the two or more first IGBT devices of the first NPC bridge arm, and a second signal output end of the first driving board being connected to each of gates of the two or more second IGBT devices of the second NPC bridge arm.

8. The power component according to claim 3, wherein;
the third NPC bridge arm comprises two or more IGBT devices connected in series; and
the power component further comprises:
a second driving board, the second driving board being arranged on the third NPC bridge arm unit, and a signal output end of the second driving board being connected to each of gates of the two or more IGBT devices of the third NPC bridge arm.

9. The power component according to claim 3, wherein:
the third end of the third NPC bridge arm unit comprises third connection ends of the plurality of third NPC bridge arms; and
the power component further comprises:
an alternating current busbar, the alternating current busbar being connected to each of the third connection ends of the plurality of third NPC bridge arms.

10. A three-level converter, comprising:
a power component, comprising:
a first Neutral Point Clamped (NPC) bridge arm unit, the first NPC bridge arm unit comprising a plurality of first NPC bridge arms connected in parallel, a first end of the first NPC bridge arm unit forming a direct current positive electrode end, and a second end of the first NPC bridge arm unit forming a direct current neutral point end;
a second NPC bridge arm unit, the second NPC bridge arm unit comprising a plurality of second NPC bridge arms connected in parallel, a first end of the second NPC bridge arm unit being connected to the second end of the first NPC bridge arm unit, and a second end of the second NPC bridge arm unit forming a direct current negative electrode end; and
a third NPC bridge arm unit, the third NPC bridge arm unit comprising a plurality of third NPC bridge arms connected in parallel, a first end of the third NPC bridge arm unit being connected to a third end of the first NPC bridge arm unit, a second end of the third NPC bridge arm unit being connected to a third end of the second NPC bridge arm unit, and a third end of the third NPC bridge arm unit forming an alternating current end,
wherein a total number of the second NPC bridge arms in the second NPC bridge arm unit is the same as a total number of the first NPC bridge arms in the first NPC bridge arm unit, and a total number of the third NPC bridge arms in the third NPC bridge arm unit is determined based on a ratio of a loss of the first NPC bridge arms to a loss of the third NPC bridge arms.

11. The three-level converter according to claim 10, wherein the total number of the third NPC bridge arms is a value rounded up from a quotient of the total number of the first NPC bridge arms divided by the ratio.

12. The three-level converter according to claim 10, wherein the power component further comprises:
a heat dissipation plate, the heat dissipation plate comprising a first heat dissipation region and a second heat dissipation region,
wherein the plurality of first NPC bridge arms and the plurality of second NPC bridge arms are alternately arranged in the first heat dissipation region, and
wherein the plurality of third NPC bridge arms are linearly arranged in the second heat dissipation region along an arrangement direction of the plurality of first NPC bridge arms and the plurality of second NPC bridge arms.

13. The three-level converter according to claim 12, wherein:
the third end of the first NPC bridge arm unit comprises third connection ends of the plurality of first NPC bridge arms, the third end of the second NPC bridge arm unit comprises third connection ends of the plurality of second NPC bridge arms, the first end of the third NPC bridge arm unit comprises first connection ends of the plurality of third NPC bridge arms, and the second end of the third NPC bridge arm unit comprises second connection ends of the plurality of third NPC bridge arms; and
the power component further comprises:
a first connection busbar, the first connection busbar connecting the third connection ends of the plurality of first NPC bridge arms with the first connection ends of the plurality of third NPC bridge arms;
a second connection busbar, the second connection busbar connecting the third connection ends of the plurality of second NPC bridge arms with the second connection ends of the plurality of third NPC bridge arms; and
an insulation structure, the insulation structure being arranged between the first connection busbar and the second connection busbar.

14. The three-level converter according to claim 12, wherein the power component further comprises:
a direct current busbar, the direct current busbar being connected to the first heat dissipation region of the heat dissipation plate, the direct current busbar comprising a positive electrode of the direct current busbar, and a neutral point of the direct current busbar and a negative electrode of the direct current busbar,
wherein the first end of the first NPC bridge arm unit comprises first connection ends of the plurality of first NPC bridge arms, and the second end of the first NPC bridge arm unit comprises second connection ends of the plurality of first NPC bridge arms,
wherein the first end of the second NPC bridge arm unit comprises first connection ends of the plurality of second NPC bridge arms, and the second end of the second NPC bridge arm unit comprises second connection ends of the plurality of second NPC bridge arms, and
wherein the first connection ends of the plurality of first NPC bridge arms are each connected to the positive electrode of the direct current busbar, the second connection ends of the plurality of first NPC bridge arms and the first connection ends of the plurality of second NPC bridge arms are each connected to the neutral point of the direct current busbar, and the second connection ends of the plurality of second NPC bridge arms are each connected to the negative electrode of the direct current busbar.

15. The three-level converter according to claim 14, wherein the power component further comprises:
a capacitor bank, the capacitor bank being arranged on the direct current busbar, the capacitor bank comprising first capacitor units and second capacitor units, a first end of each of the first capacitor units being connected to the positive electrode of the direct current busbar and a corresponding first connection end of the first connection ends of the plurality of first NPC bridge arms, a second end of each of the first capacitor units being connected to the neutral point of the direct current busbar and a corresponding second connection end of the second connection ends of the plurality of first NPC bridge arms, a first end of each of the second capacitor units being connected to the neutral point of the direct current busbar and a corresponding first connection end of the first connection ends of the plurality of second NPC bridge arms, and a second end of each of the second capacitor units being connected to the negative electrode of the direct current busbar and a corresponding second connection end of the second connection ends of the plurality of second NPC bridge arms.

16. The three-level converter according to claim 12, wherein:
the first NPC bridge arm comprises two or more first IGBT devices connected in series, and the second NPC bridge arm comprises two or more second IGBT devices connected in series; and
the power component further comprises:
a first driving board, the first driving board being arranged on the first NPC bridge arm unit and the second NPC bridge arm unit, a first signal output end of the first driving board being connected to each of gates of the two or more first IGBT devices of the first NPC bridge arm, and a second signal output end of the first driving board being connected to each of gates of the two or more second IGBT devices of the second NPC bridge arm.

17. The three-level converter according to claim 12, wherein:
the third NPC bridge arm comprises two or more IGBT devices connected in series; and
the power component further comprises:
a second driving board, the second driving board being arranged on the third NPC bridge arm unit, and a signal output end of the second driving board being connected to each of gates of the two or more IGBT devices of the third NPC bridge arm.

18. The three-level converter according to claim 12, wherein:
the third end of the third NPC bridge arm unit comprises third connection ends of the plurality of third NPC bridge arms; and
the power component further comprises:
an alternating current busbar, the alternating current busbar being connected to each of the third connection ends of the plurality of third NPC bridge arms.

19. A wind turbine, comprising:
a three-level converter, comprising:
a power component, comprising:
a first Neutral Point Clamped (NPC) bridge arm unit, the first NPC bridge arm unit comprising a plurality of first NPC bridge arms connected in parallel, a first end of the first NPC bridge arm unit forming a direct current positive electrode end, and a second end of the first NPC bridge arm unit forming a direct current neutral point end;
a second NPC bridge arm unit, the second NPC bridge arm unit comprising a plurality of second NPC bridge arms connected in parallel, a first end of the second NPC bridge arm unit being connected to the second end of the first NPC bridge arm unit, and a second end of the second NPC bridge arm unit forming a direct current negative electrode end; and
a third NPC bridge arm unit, the third NPC bridge arm unit comprising a plurality of third NPC bridge arms connected in parallel, a first end of the third NPC bridge arm unit being connected to a third end of the first NPC bridge arm unit, a second end of the third NPC bridge arm unit being connected to a third end of the second NPC bridge arm unit, and a third end of the third NPC bridge arm unit forming an alternating current end,
wherein a total number of the second NPC bridge arms in the second NPC bridge arm unit is the same as a total number of the first NPC bridge arms in the first NPC bridge arm unit, and a total number of the third NPC bridge arms in the third NPC bridge arm unit is determined based on a ratio of a loss of the first NPC bridge arms to a loss of the third NPC bridge arms.

20. The wind turbine according to claim 19, wherein the wind turbine is a direct-drive wind turbine, a doubly-fed wind turbine or a semi-direct-drive wind turbine.

* * * * *